(12) United States Patent
Durco et al.

(10) Patent No.: US 11,110,464 B2
(45) Date of Patent: Sep. 7, 2021

(54) SAMPLE CONTAINER CARRIER, LABORATORY SAMPLE DISTRIBUTION SYSTEM AND LABORATORY AUTOMATION SYSTEM

(71) Applicant: Roche Diagnostics Operations, Inc., Indianapolis, IN (US)

(72) Inventors: Rudolf Durco, Kornwestheim (DE); Marcel Kaeppeli, Merendschwand (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 139 days.

(21) Appl. No.: 16/127,869

(22) Filed: Sep. 11, 2018

(65) Prior Publication Data

US 2019/0076846 A1 Mar. 14, 2019

(30) Foreign Application Priority Data

Sep. 13, 2017 (EP) .................................... 17190904

(51) Int. Cl.
*B01L 9/06* (2006.01)
*G01N 35/04* (2006.01)
*B65G 47/86* (2006.01)

(52) U.S. Cl.
CPC ............... *B01L 9/06* (2013.01); *G01N 35/04* (2013.01); *B01L 2200/023* (2013.01); *B01L 2200/025* (2013.01); *B65G 47/842* (2013.01); *B65G 2201/0261* (2013.01); *G01N 2035/0406* (2013.01); *G01N 2035/0429* (2013.01); *G01N 2035/0477* (2013.01); *G01N 2035/0489* (2013.01)

(58) Field of Classification Search
None
See application file for complete search history.

(56) References Cited

U.S. PATENT DOCUMENTS

| | | | |
|---|---|---|---|
| 3,273,727 A | 9/1966 | Rogers et al. | |
| 3,653,485 A | 4/1972 | Donlon | |
| 3,901,656 A | 8/1975 | Durkos et al. | |
| 4,150,666 A | 4/1979 | Brush | |
| 4,395,164 A | 7/1983 | Beltrop et al. | |
| 4,526,756 A * | 7/1985 | Wong | B01L 9/06 206/443 |
| 4,544,068 A | 10/1985 | Cohen | |
| 4,771,237 A | 9/1988 | Daley | |
| 5,120,506 A | 6/1992 | Saito et al. | |
| 5,244,082 A | 9/1993 | Togashi | |

(Continued)

FOREIGN PATENT DOCUMENTS

| CN | 201045617 Y | 4/2008 |
|---|---|---|
| CN | 102109530 A | 6/2011 |

(Continued)

OTHER PUBLICATIONS

Oxford definition of translate. (Year: 2020).*

*Primary Examiner* — Matthew D Krcha
(74) *Attorney, Agent, or Firm* — Roche Diagnostics Operations, Inc.

(57) ABSTRACT

A sample container carrier, a laboratory sample distribution system comprising such a sample container carrier and a laboratory automation system comprising such a laboratory sample distribution system are presented.

13 Claims, 8 Drawing Sheets

(56) References Cited

U.S. PATENT DOCUMENTS

| | | |
|---|---|---|
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,567,167 B2 | 2/2017 | Sinz |
| 9,575,086 B2 | 2/2017 | Heise et al. |
| 9,593,970 B2 | 3/2017 | Sinz |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 9,902,572 B2 | 2/2018 | Mahmudimanesh et al. |
| 9,939,455 B2 | 4/2018 | Schneider et al. |
| 9,952,242 B2 | 4/2018 | Riether |
| 9,969,570 B2 | 5/2018 | Heise et al. |
| 9,989,547 B2 | 6/2018 | Pedain |
| 10,288,634 B2 | 5/2019 | Kaeppeli |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0037502 A1 | 2/2005 | Miller |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | Labarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0015007 A1* | 1/2010 | Pedrazzini ............... B01L 9/06 422/64 |
| 2010/0152895 A1 | 6/2010 | Dai |
| 2010/0175943 A1 | 7/2010 | Bergmann |
| 2010/0186618 A1 | 7/2010 | King et al. |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0202829 A1 | 7/2014 | Eberhardt et al. |
| 2014/0234949 A1 | 8/2014 | Wasson et al. |
| 2015/0014125 A1* | 1/2015 | Hecht ................ G01N 35/04 198/468.2 |
| 2015/0140668 A1 | 5/2015 | Mellars et al. |
| 2015/0166265 A1 | 6/2015 | Pollack et al. |
| 2015/0233956 A1 | 8/2015 | Buehr |
| 2015/0233957 A1 | 8/2015 | Riether |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |
| 2015/0276782 A1 | 10/2015 | Riether |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0229565 A1 | 8/2016 | Margner |
| 2016/0274137 A1 | 9/2016 | Baer |
| 2016/0282378 A1 | 9/2016 | Malinowski et al. |
| 2016/0341750 A1 | 11/2016 | Sinz et al. |
| 2016/0341751 A1 | 11/2016 | Huber et al. |
| 2017/0059599 A1 | 3/2017 | Riether |
| 2017/0097372 A1 | 4/2017 | Heise et al. |
| 2017/0101277 A1 | 4/2017 | Malinowski |
| 2017/0108522 A1 | 4/2017 | Baer |
| 2017/0131307 A1 | 5/2017 | Pedain |
| 2017/0131310 A1 | 5/2017 | Volz et al. |
| 2017/0138971 A1 | 5/2017 | Heise et al. |
| 2017/0153262 A1 | 6/2017 | Lair |
| 2017/0168079 A1 | 6/2017 | Sinz |

(56) References Cited

U.S. PATENT DOCUMENTS

| | | |
|---|---|---|
| 2017/0174448 A1 | 6/2017 | Sinz |
| 2017/0184622 A1 | 6/2017 | Sinz et al. |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0074087 A1 | 3/2018 | Heise et al. |
| 2018/0106821 A1 | 4/2018 | Vollenweider et al. |
| 2018/0128848 A1 | 5/2018 | Schneider et al. |
| 2018/0156835 A1 | 6/2018 | Hassan |
| 2018/0188280 A1 | 7/2018 | Malinowski |
| 2018/0210000 A1 | 7/2018 | van Mierlo |
| 2018/0210001 A1 | 7/2018 | Reza |
| 2018/0217174 A1 | 8/2018 | Malinowski |
| 2018/0217176 A1 | 8/2018 | Sinz et al. |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |
| 2020/0200783 A1 | 6/2020 | Durco |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2011/132037 A1 | 10/2011 |
| WO | 2012/158520 A1 | 11/2012 |
| WO | 2012/158541 A1 | 11/2012 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |
| WO | 2015/155147 A1 | 10/2015 |
| WO | WO-2016012517 A1 * | 1/2016 ............ G01N 35/04 |

* cited by examiner

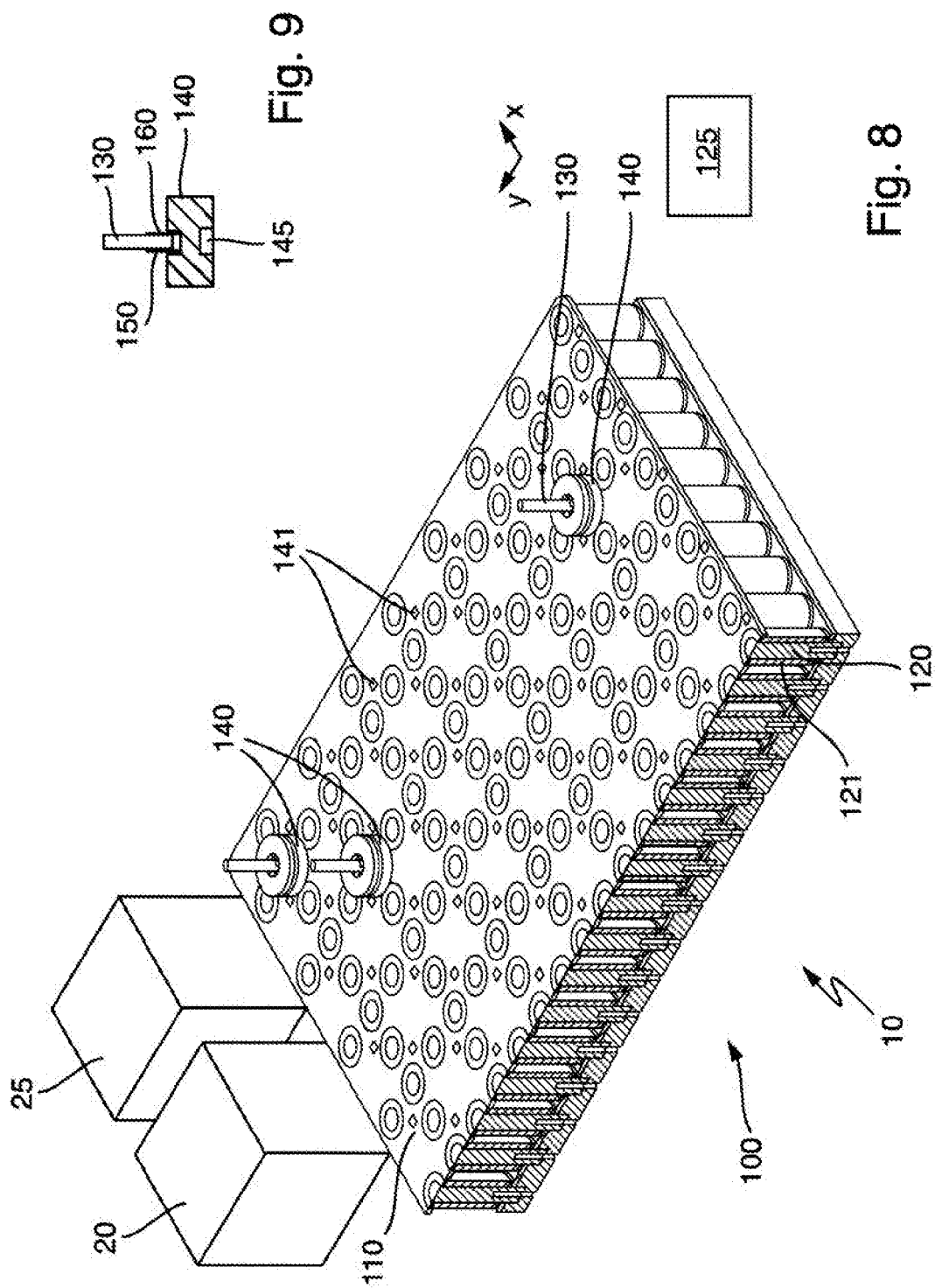

SAMPLE CONTAINER CARRIER, LABORATORY SAMPLE DISTRIBUTION SYSTEM AND LABORATORY AUTOMATION SYSTEM

CROSS-REFERENCE TO RELATED APPLICATIONS

This application claims priority to EP 17190904.7, filed Sep. 13, 2017, which is hereby incorporated by reference.

BACKGROUND

The present disclosure generally relates to a sample container carrier, a laboratory sample distribution system comprising such a sample container carrier and a laboratory automation system comprising such a laboratory sample distribution system.

Known laboratory sample distribution systems are typically used in laboratory automation systems in order to distribute laboratory samples contained in laboratory sample containers between different laboratory stations by means of sample container carriers. These sample container carriers can comprise spring arms for holding the laboratory sample container.

However, there is a need for a sample container carrier having improved holding properties than sample container carriers of the prior art as well as a laboratory sample distribution system comprising such a sample container carrier and a laboratory automation system comprising such a laboratory sample distribution system.

SUMMARY

According to the present disclosure, a sample container carrier for holding a laboratory sample container and for transporting the held laboratory sample container in a laboratory sample distribution system is presented. The sample container carrier can comprise a first holding element and a second holding element. The first holding element and the second holding element can be translationally displaceable towards and/or away from each other for holding the laboratory sample container. The sample container carrier can also comprise a coupler comprising a lever. The coupler can be connected to the first holding element and to the second holding element by the lever such that the coupler can couple translational displacements of the first holding element and the second holding element with each other.

Accordingly, it is a feature of the embodiments of the present disclosure to provide for a sample container carrier having improved holding properties than sample container carriers of the prior art as well as to provide for a laboratory sample distribution system comprising such a sample container carrier and a laboratory automation system comprising such a laboratory sample distribution system. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 8 illustrates a perspective view of a laboratory automation system according to the invention comprising the sample container carrier of FIG. 1 holding a laboratory sample container according to an embodiment of the present disclosure.

FIG. 9 illustrates a schematic cross section view of the sample container carrier of FIG. 1 holding the laboratory sample container according to an embodiment of the present disclosure.

DETAILED DESCRIPTION

Figure 1:
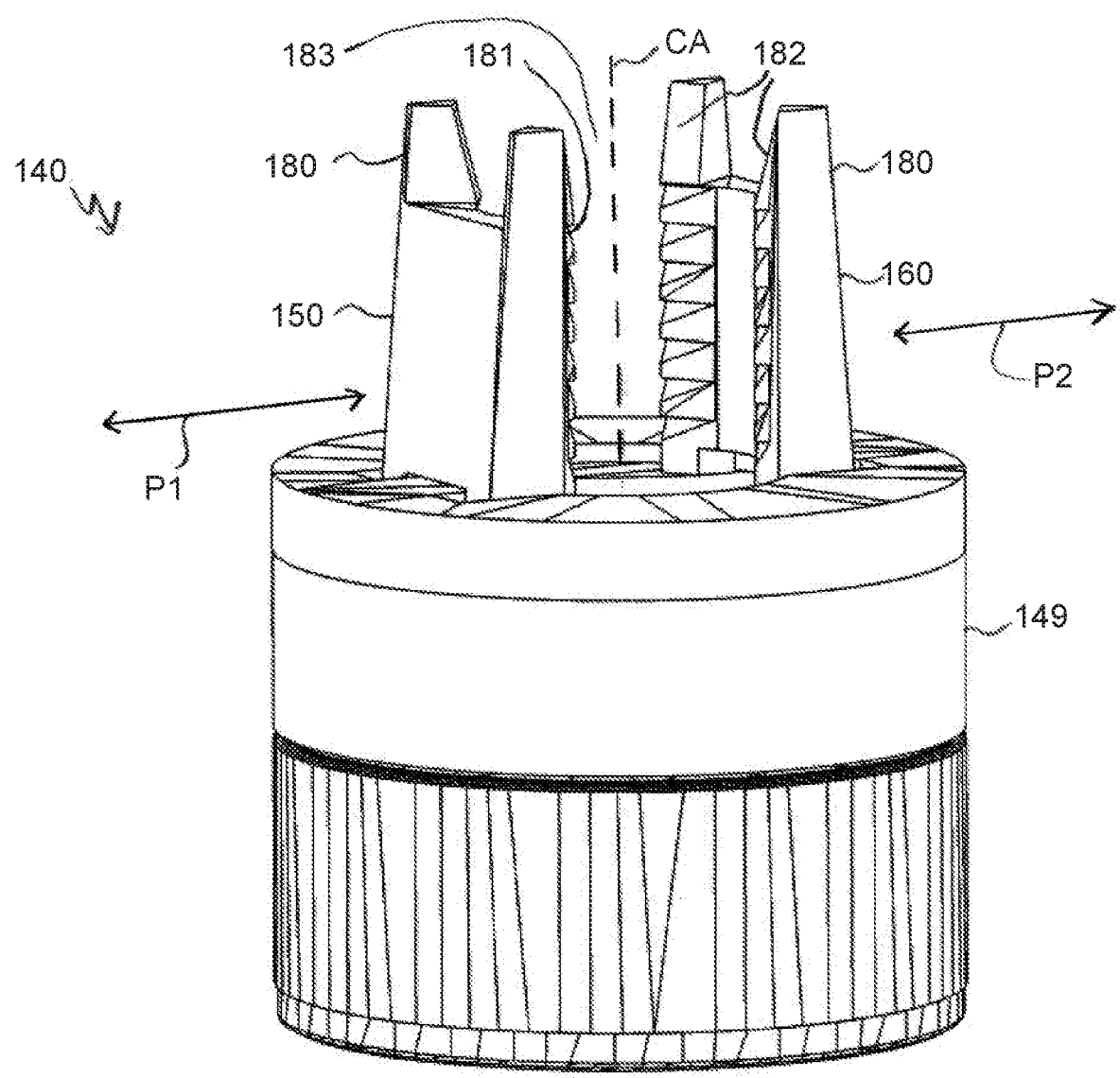
FIG. 1 illustrates a perspective view of a sample container carrier according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A sample container carrier for holding a laboratory sample container and for transporting the held laboratory sample container in a laboratory sample distribution system is disclosed. The sample container carrier can comprise a first holding element and a second holding element. The first holding element and the second holding element can be translationally displaceable towards and/or away from each other for holding the laboratory sample container. Furthermore, the sample container carrier can comprise a coupler. The coupler can be connected such as, for example, directly and/or mechanically connected, to the first holding element and to the second holding element such that the coupler can couple translational displacements of the first holding element and the second holding element with each other.

The laboratory sample container may be designed as a tube made of glass or transparent plastic and may have an opening at an upper end. The laboratory sample container may be used to contain, store and transport a laboratory sample such as a blood sample, a urine sample or a chemical sample.

The sample container carrier may comprise only, or exactly, the two holding elements, namely the first holding element and the second holding element. Alternatively, the sample container carrier may comprise a third holding element, or additionally, a fourth holding element, or even more holding elements. All of the holding element(s) may be translationally displaceable towards and/or away from each other for holding the laboratory sample container. The coupler may be connected to all of the holding elements such that the coupler may couple translational displacements of all of the holding elements with each other. In one embodiment, the first holding element and/or the second holding element may be radially displaceable such as, for example, only radially displaceable and/or horizontally such as, for example, orthogonal to a central axis of the sample container carrier. In other words: the first holding element and/or the second holding element may not be or do/does not have to be vertically displaceable such as, for example, along the central axis. The first holding element and/or the second holding element may only be translationally displaceable. In other words, the first holding element and/or the second holding element may not be or do/does not have to be rotationally displaceable or moveable.

The first holding element and/or the second holding element may be configured to be in direct contact with the laboratory sample container for holding the laboratory sample container. The held laboratory sample container may be at least partially positioned between the first holding element and the second holding element. In one embodiment, the first holding element and the second holding element may be arranged such as, for example, in a symmetric, manner around a center and/or a central axis of the sample container carrier such that a point or line of contact, i.e., holding, of each of the first holding element and the second holding element with the laboratory sample container can be equidistant from the center and/or from the central axis of the sample container carrier. The center may be located on the central axis. The center may be a center of gravity of the sample container carrier. The central axis may be a symmetry axis of the sample container carrier such as, for example, a longitudinal and/or a vertical axis. In other words, the held laboratory sample container may be centralized by the first holding element and the second holding element into the center of the sample container carrier. The held laboratory sample container may comprise a circumference, wherein the first holding element and/or the second holding element hold the laboratory sample container at its circumference. The held laboratory sample container may be held by the first holding element and/or the second holding element such that the opening of the laboratory sample container, if present, may be facing away from the sample container carrier. Furthermore, the sample container carrier may comprise a support, wherein the held laboratory sample container such as, for example, an end face or a bottom of the laboratory sample container, may be supported by the support.

The coupler may be a mechanical coupler. The coupler may be a gear, a slide, a belt or a rubber band. The coupler may be configured to perform a movement when the first holding element and/or the second holding element may be translationally displaced. The coupler may be configured to transfer a translational displacement of the first holding element into a translation displacement of the second holding element. The coupler may be configured to transfer a translational displacement of the second holding element into a translation displacement of the first holding element.

The sample container carrier can enable a synchronization of the translational displacements of the first holding element and the second holding element. This may enable holding the laboratory sample container in a defined holding position such as, for example, independent from a type and/or a size of the laboratory sample container. Furthermore, this may enable each of the first holding element and the second holding element to apply a similar or identical holding force value to the laboratory sample container. Thereby, balanced forces may be provided. Moreover, the translational displacements of the first holding element and the second holding element can enable a relatively simple construction design of the sample container carrier.

According to an embodiment, the coupler can comprise a lever, and in one embodiment, is a lever, wherein the lever can be connected to the first holding element and to the second holding element. The connection may be a positive connection. The lever may comprise or be a lever rod, a crank or an arm.

According to an embodiment, the coupler can be rotationally moveable such that the coupler can couple by its rotational movement the translational displacements of the first holding element and the second holding element with each other. In one embodiment, the coupler may only be rotationally moveable. The coupler may be rotationally moveable around the center and/or the central axis of the sample container carrier. The coupler may perform a rotational movement when the first holding element and/or the second holding element are/is displaced. The coupler may not perform a translational movement. The sample container carrier may comprise a base body, wherein the coupler may be moveably mounted to the base body.

According to an embodiment, the first holding element and/or the second holding element can comprise a plurality of jaws (e.g., 1 to 10) for holding the laboratory sample container. In one embodiment, each holding element may comprise only one jaw. The jaws may be configured to be in direct contact with the held laboratory sample container. Each jaw may comprise or form a circular, segment, or section. The plurality of jaws and their longitudinal axes, respectively, may be oriented substantially parallel to the center and/or the central axis. The first holding element and/or the second holding element may be a multi-component injection molding part, wherein the jaws may be made of a softer material such as, for example, a rubber-based-material. The plurality of jaws may comprise a plurality of first jaws and a plurality of second jaws, wherein the first holding element and the plurality of first jaws may be formed in one-piece and/or the second holding element and the plurality of second jaws may be formed in one-piece.

According to an embodiment, the jaws can be distributed around the central axis in an equidistant and/or equiangular manner.

According to an embodiment, at least one of the plurality of jaws can comprise a corrugation for holding the laboratory sample container. This can enable a relatively high friction and/or grip between the corrugated jaw and the laboratory sample container. The corrugation may be a ribbing. In one embodiment, the corrugation may be configured not to destroy and/or to affect the laboratory sample container.

According to an embodiment, the first holding element and/or the second holding element can comprise an insertion support. The insertion support can be configured to cooperate together with the laboratory sample container to be held such that the holding element comprising the insertion support can be translationally displaced when the laboratory sample container is inserted into the sample container carrier. This can enable a relatively simple insertion of the laboratory sample container to be held into the sample container carrier. The insertion support may be an inclined plane, inclined surface or inclined edge. At least one respective jaw of the plurality of jaws, if present, may comprise the insertion support.

According to an embodiment, the sample container carrier can comprise a retaining element applying a force to the first holding element and/or to the second holding element and/or to the coupler such that the first holding element and the second holding element can be force-loaded towards each other for holding the laboratory sample container. This can enable a relatively reliable holding of the laboratory sample container. Additionally, or alternatively, the retaining element may apply a force such that the first holding element and the second holding element may be translationally displaced towards each other such as, for example, into a default position, when the laboratory sample container may be removed from the sample container carrier. The retaining element may comprise or be an elastic element. The retaining element may comprise or be a spring, a rubber element, a rubber band, at least one magnet, a cable pulley system, a pneumatic system or a hydraulic system. The default position may be a position of the first holding element and the second holding element, wherein a distance between the first holding and the second holding element may be minimal.

According to an embodiment, the sample container carrier can comprise a plurality of guiding elements (e.g., 1 to 8), wherein the plurality of guiding elements can be configured to guide the translational displacement/s of the first holding element and/or the second holding element. This may enable that the first holding element and/or the second holding element may be translationally displaced along a predefined path. The first holding element and/or the second holding element may be translationally displaceable mounted to the guiding elements. The first holding element and/or the second holding element may slide along the guiding elements when the first holding element and/or the second holding element may be displaced. The plurality of guiding elements may extend in one dimension. The plurality of guiding elements may be a linear guidance. The plurality of guiding elements may comprise or be a rod or a groove. The plurality of guiding elements may at least partially extend within the base body of the sample container carrier, if present.

According to an embodiment, the plurality of guiding elements can comprise a plurality of rails (e.g., 1 to 8, and in one embodiment, 4), wherein the plurality of rails can be configured to guide the translational displacement(s) of the first holding element and/or the second holding element. The plurality of rails may extend within the base body, if present.

According to an embodiment, the guiding elements can be arranged substantially parallel to each other and/or wherein the coupler can be arranged between the guiding elements. This can enable a relatively compact construction design. The guiding elements may comprise a plurality of first guiding elements and a plurality of second guiding elements. The plurality of first guiding elements may be placed at a first level and the plurality of second guiding elements may be placed at a second level. The first level and the second level may be a vertical level. The first level and the second level may be different from each other. The plurality of first guiding elements may be configured to guide the translational displacement of the first holding element. The plurality of second guiding elements may be configured to guide the translational displacement of the second holding element.

According to an embodiment, the sample container carrier can comprise a magnetically active element, wherein the magnetically active element can be configured to interact with a magnetic field generated by a drive element such that a driving force such as, for example, a magnetic driving force, can be applied to the sample container carrier. The magnetically active element may be a permanent magnet or an electro-magnet. The magnetically active element may comprise a magnetically soft material.

A laboratory sample distribution system is also presented. The laboratory sample distribution system can comprise a plurality of sample container carriers (e.g., 1 to 1000) as described above, a transport plane, a plurality of drive elements (e.g., 1 to 10000) and a control device. The transport plane can be configured to support the plurality of sample container carriers. The plurality of drive elements can be configured to move the plurality of sample container carriers on the transport plane. The control device can be configured to control the plurality of drive elements such that the plurality of sample container carriers can move on the transport plane along corresponding transport paths.

The transport plane may also be denoted as transport surface. The transport plane may support the sample container carriers, what may also be denoted as carrying the sample container carriers. The sample container carriers may be translationally moved on the transport plane. The sample container carriers may be configured to move in two dimensions on the transport plane. The plurality of sample container carriers may slide over the transport plane. The control device may be an integrated circuit, a tablet computer, a smartphone, a computer or a processing control system. Each of the sample container carriers may move on the transport plane along an individual transport path.

According to an embodiment, the plurality of drive elements can comprise a plurality of electro-magnetic actuators (e.g. 1 to 10000), wherein the plurality of electro-magnetic actuators can be stationary arranged below the transport plane and can be configured to generate a magnetic field to move the plurality of sample container carriers on the transport plane. Each of the plurality of sample container carriers can comprise a magnetically active element, wherein the magnetically active element can be configured to interact with the magnetic field generated by the plurality of electro-magnetic actuators such that a driving force such as, for example, a magnetic driving force, can be applied to the sample container carrier. The control device can be configured to control the plurality of electro-magnetic actuators such that the plurality of sample container carriers can move on the transport plane along corresponding transport paths. In one embodiment, the electro-magnetic actuators may be solenoids surrounding ferromagnetic cores. Furthermore, the electro-magnetic actuators may be driven or energized individually in order to generate or to provide the magnetic field. The electro-magnetic actuators may be arranged in two dimensions such as, for example, in a grid or matrix having rows and columns, along which the electro-magnetic actuators can be arranged. The electro-magnetic actuators may be arranged in a plane substantially parallel to the transport plane.

A laboratory automation system is also presented. The laboratory automation system can comprise a plurality of laboratory stations (e.g., 1 to 50) and a laboratory sample distribution system as described above. The laboratory sample distribution system can be configured to distribute the plurality of sample container carriers and/or laboratory sample containers between the laboratory stations.

The laboratory stations may be arranged adjacent or directly next to the laboratory sample distribution system such as, for example, to the transport plane of the laboratory sample distribution system. The plurality of laboratory stations may comprise pre-analytical, analytical and/or post-analytical laboratory stations. Pre-analytical laboratory stations may be configured to perform any kind of pre-processing of samples, sample containers and/or sample container carriers. Analytical laboratory stations may be configured to use a sample or part of the sample and a reagent to generate a measuring signal, the measuring signal indicating if and in which concentration, if any, an analyte exists. Post-analytical laboratory stations may be configured to perform any kind of post-processing of samples, sample containers and/or sample container carriers. The pre-analytical, analytical and/or post-analytical laboratory stations may comprise at least one of a decapping station, a recapping station, an aliquot station, a centrifugation station, an archiving station, a pipetting station, a sorting station, a tube type identification station, a sample quality determining station, an add-on buffer station, a liquid level detection station, a sealing/desealing station, a pushing station, a belt station, a conveying system station and/or a gripper station for moving the sample container to or from the sample container carrier.

FIGS. 1-9 show a sample container carrier 140 for holding a laboratory sample container 130 and for transporting the held laboratory sample container 130 in a laboratory sample distribution system 100. The sample container carrier 140 can comprise a first holding element 150, a second holding element 160 and a coupler 170. The first holding element 150 and the second holding element 160 can be translationally displaceable towards and/or away from each other for holding the laboratory sample container 130. The coupler 170 can be connected to the first holding element 150 and to the second holding element 160 such that the coupler 170 can couple translational displacements of the first holding element 150 and the second holding element 160 with each other.

In alternative embodiments, the sample container carrier may comprise a third holding element, or additionally, a fourth holding element, or even more holding elements. All of the holding element/s may be translationally displaceable towards and/or away from each other for holding the laboratory sample container. The coupler may be connected to all of the holding elements such that the coupler can couple translational displacements of all of the holding elements with each other.

Figure 5:
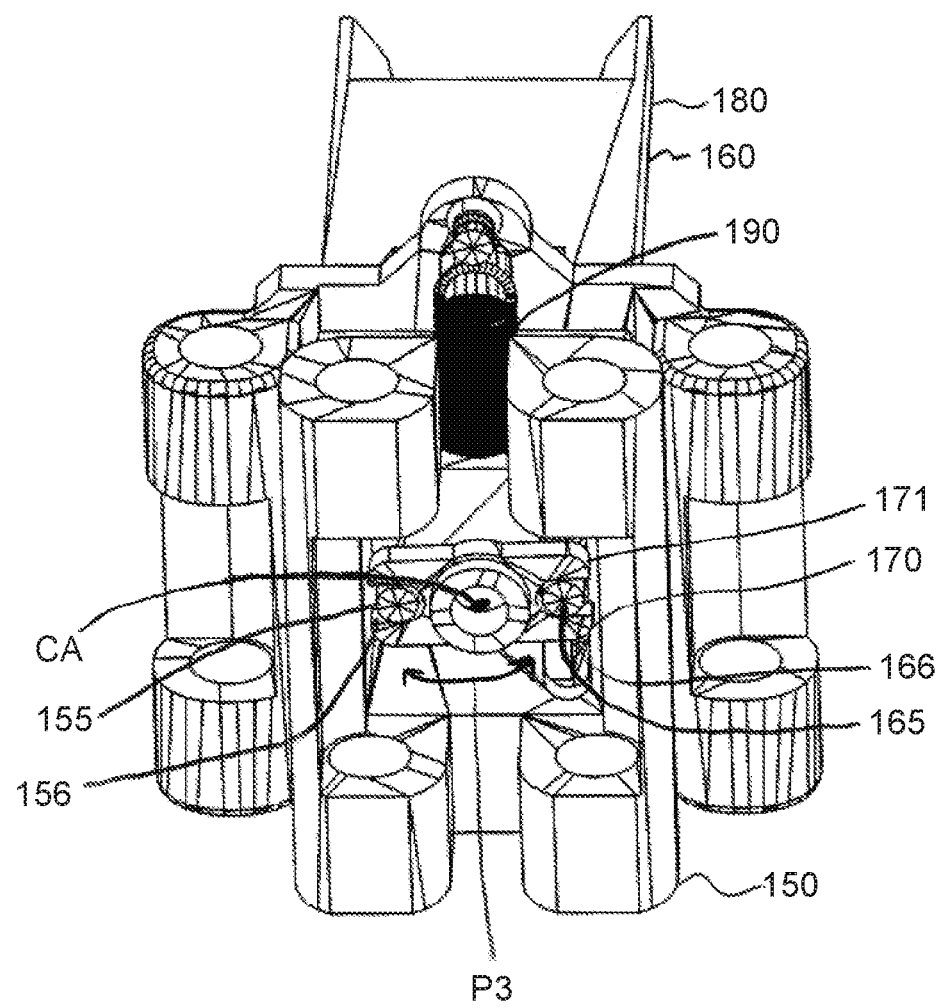
FIG. 5 illustrates a perspective view of the first holding element, the second holding element, the number of guiding elements, a coupler and a retaining element of the sample container carrier of FIG. 1 according to an embodiment of the present disclosure.
Figure 6:
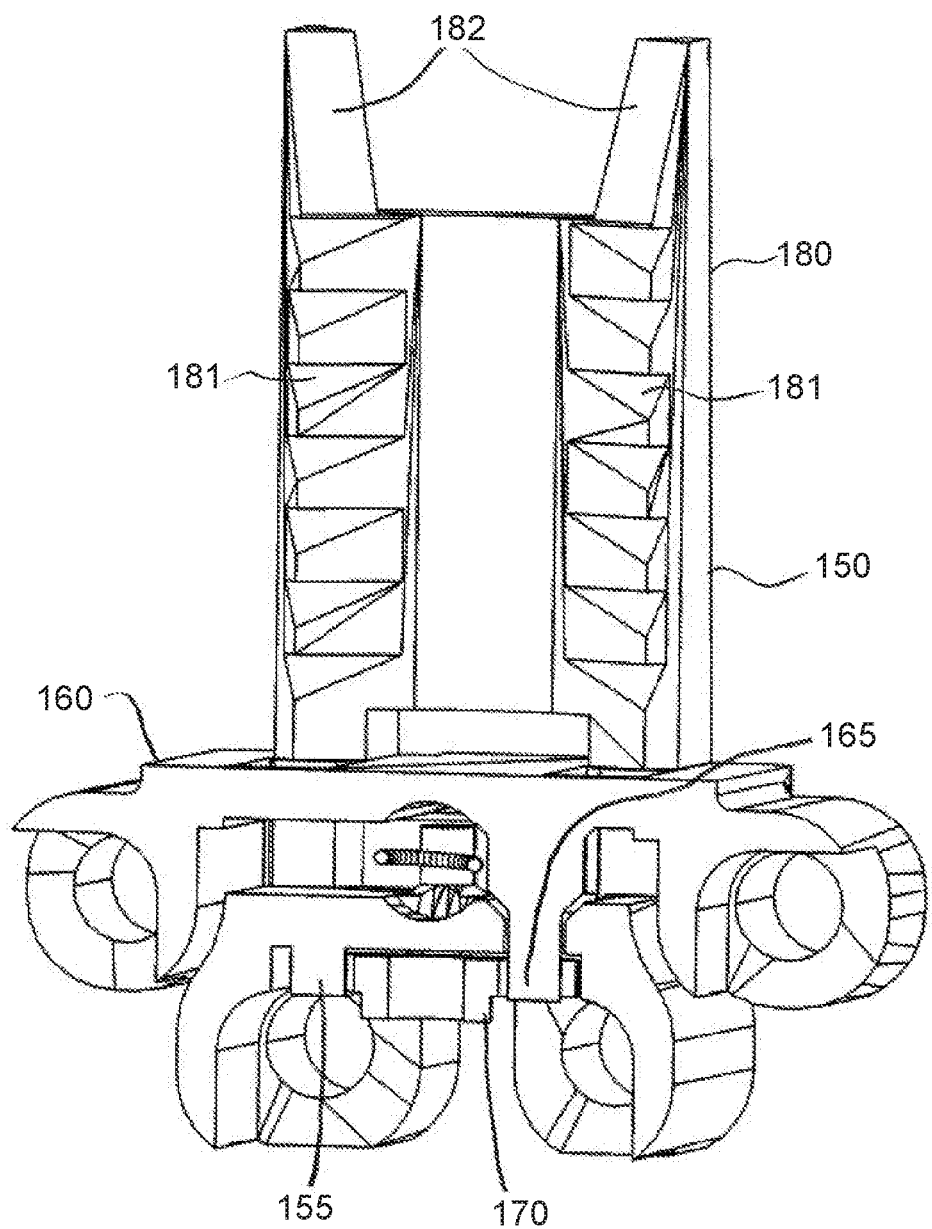
FIG. 6 illustrates a cross section view of the first holding element, the second holding element and the coupler of the sample container carrier of FIG. 1 according to an embodiment of the present disclosure.

In detail, the coupler 170 can be a lever 171, as shown in FIG. 5. The lever 171 can be connected to the first holding element 150 and to the second holding element 160. In the shown embodiment, the lever 171 can be mechanically connected by a positive connection. The positive connection can be established between a protrusion 155 of the first holding element 150 and a corresponding lead 156 of the lever 171 and a protrusion 165 of the second holding element 160 and a corresponding lead 166 of the lever 171.

The coupler 170 can be rotationally moveable such that the coupler 170 can couple by its rotational movement the translational displacements of the first holding element 150 and the second holding element 160 with each other.

In the shown embodiment, a fulcrum of the lever 171 or the rotational movement, respectively, can be arranged between an effort and a resistance of the lever 171. In alternative embodiments, the effort of the lever may be arranged between the fulcrum and the resistance. Furthermore, in alternative embodiments, the resistance of the lever may be arranged between the effort and the fulcrum.

Figure 2:
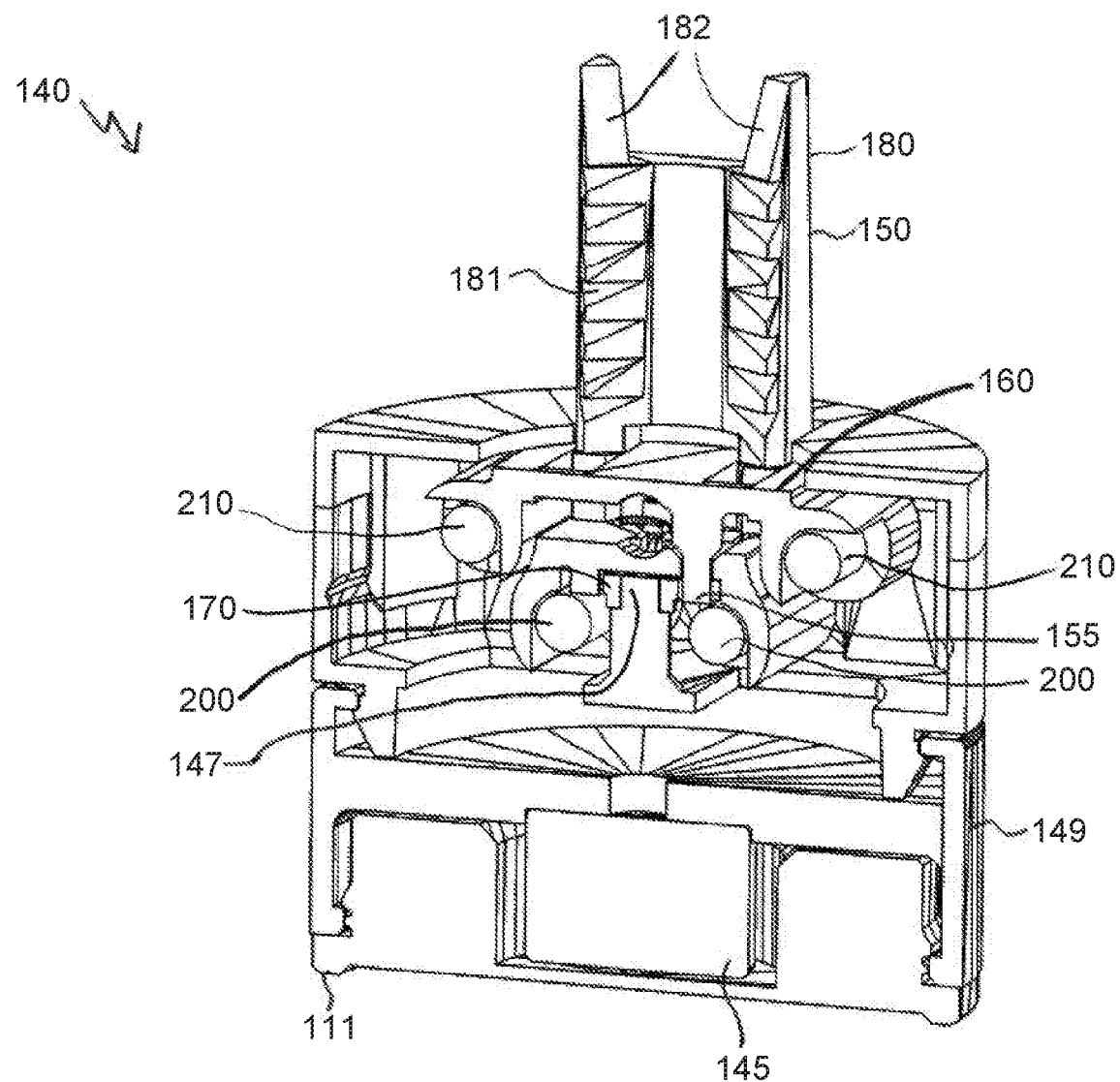
FIG. 2 illustrates a cross section view of the sample container carrier of FIG. 1 according to an embodiment of the present disclosure.
Figure 3:
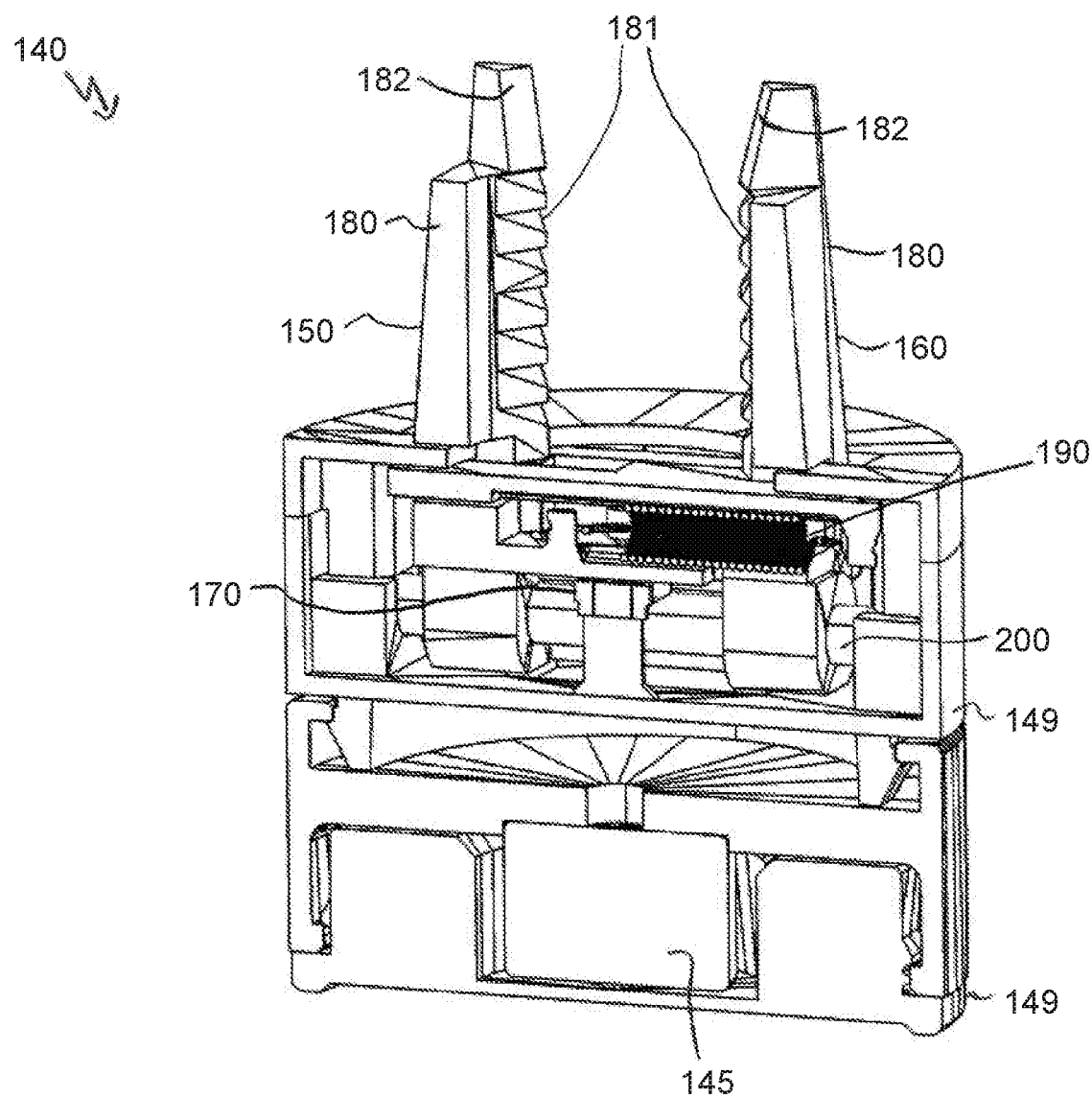
FIG. 3 illustrates another cross section view of the sample container carrier of FIG. 1 according to an embodiment of the present disclosure.
Figure 4:
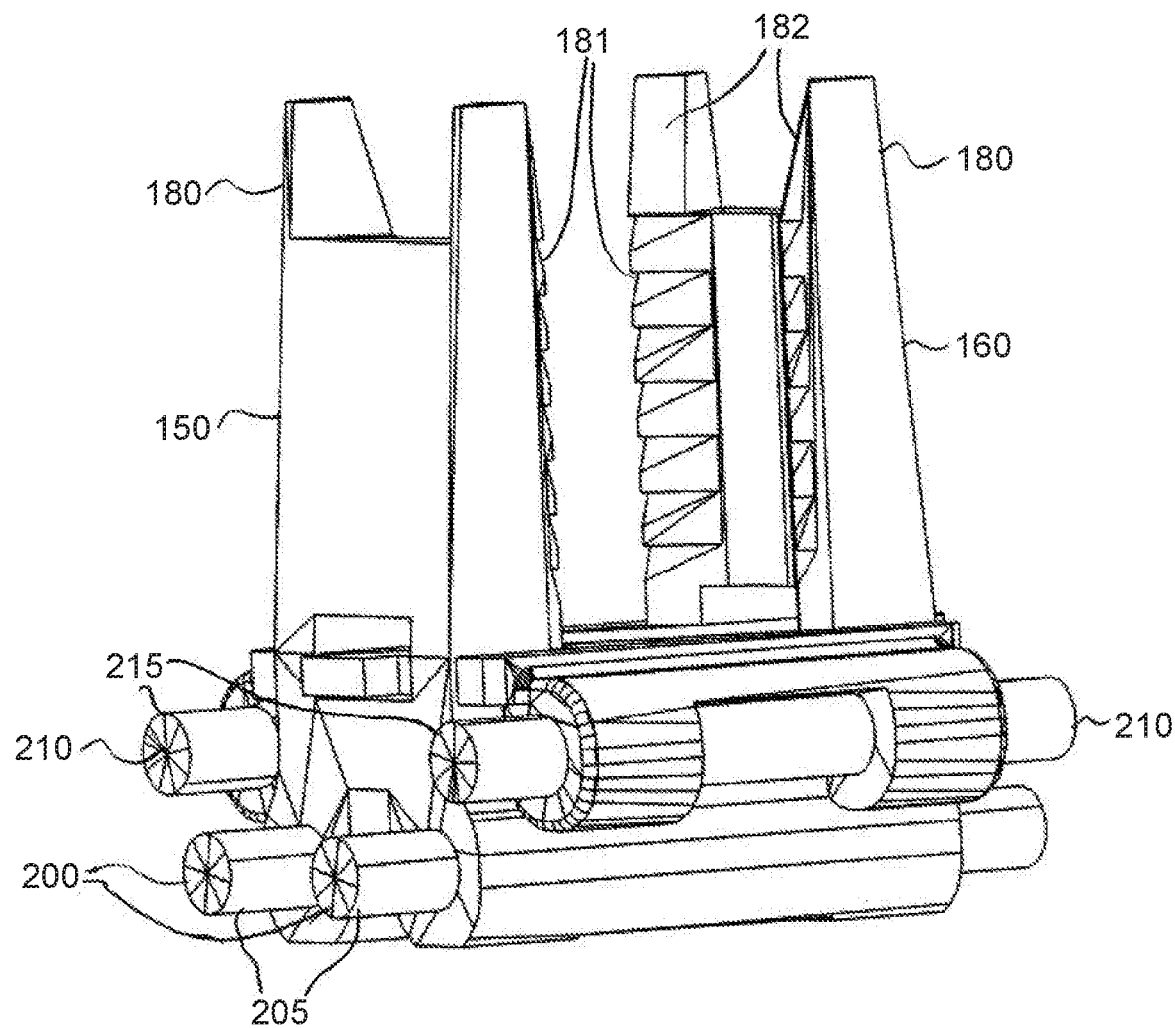
FIG. 4 illustrates a perspective view of a first holding element, a second holding element and a number of guiding elements of the sample container carrier of FIG. 1 according to an embodiment of the present disclosure.

Furthermore, the sample container carrier 140 can comprise a plurality of guiding elements 200, 210, as shown in FIGS. 2-4. The plurality of guiding elements 200, 210 can be configured to guide the translational displacements of the first holding element 150 and the second holding element 160.

In detail, the plurality of guiding elements 200, 210 can comprise or is a plurality of rails 205, 215 formed as circular cylindrical rods. The plurality of rails 205, 215 can be configured to guide the translational displacements of the first holding element 150 and the second holding element 160.

In the shown embodiment, the sample container carrier 140 can comprise four guiding elements 200, 210 such as, for example, two first guiding elements 200 and two second guiding elements 210. In alternative embodiments, the sample container carrier may comprise one, two, three, five, six or more than six guiding elements.

The first holding element 150 can be mounted translationally displaceable to or on the first guiding elements 200 and the rails 205, respectively. The second holding element 160 can be mounted translationally displaceable to the second guiding elements 210 and the rails 215, respectively. In detail, each holding element 150, 160 can comprise four joints for mounting the holding element 150, 160 to the corresponding guiding element 200, 210. The joint can encompass the corresponding guiding element 200, 210. The holding elements 150, 160 can slide along the guiding elements 200, 210 when the holding elements 150, 160 are translationally displaced.

In alternative embodiments, additionally, or alternatively, the sample container carrier such as, for example, at least one of the holding elements, may comprise at least one wheel for enabling the translational displacement.

The guiding elements 200, 210 such as, for example, the first guiding elements 200 and the second guiding elements 210, can be arranged substantially parallel to each other. In the shown embodiment, the first guiding elements 200 and the second guiding elements 210 can be placed at different vertical levels. Additionally, the coupler 170 can be arranged between the guiding elements 200, 210.

Additionally, the first holding element 150 and the second holding element 160 can be configured to guide the translational displacement of each other, as shown in FIGS. 2, 3, 6 and 7. In detail, the first holding element 150 and the second holding element 160 can be telescoped. In alternative embodiments, it may be sufficient that the first holding element and the second holding element may be configured to guide their translational displacements.

In addition, the sample container carrier 140 can comprise a base body 149. The base body 149 can be shaped such that a central axis (CA) can be a longitudinal axis of the base body 149. Furthermore, the coupler 170 and the plurality of guiding elements 200, 210 can be arranged within the base body 149. In detail, the base body 149 can comprise a coupler-protrusion 147, as shown in FIG. 2. The coupler 170 can be pivot-mounted to the coupler-protrusion 147 such that the central axis (CA) can be a rotational axis of the coupler 170.

Moreover, the first holding element 150 and the second holding element 160 can comprise a plurality of jaws for holding the laboratory sample container 130. In the shown embodiment, each holding element 150, 160 can comprise only one jaw 180. In alternative embodiments, at least one of the holding elements may comprise two, three or more than three jaws.

In detail, the jaws 180 can be distributed around the central axis (CA) in an equidistant and equiangular manner.

In the shown embodiment, an angle between the two jaws 180 can be about 180 degrees.

Further, at least one of the plurality of jaws 180 such as, for example, each jaw 180, can comprise a corrugation 181 in form of a ribbing for holding the laboratory sample container 130.

The jaws 180 and their corrugations 181, respectively, can be configured to be in direct contact with the laboratory sample container 130, as shown in FIGS. 8 and 9. In one embodiment, the first holding element 150 and the second holding element 160 and their jaws 180, respectively, can be arranged in a symmetric manner around the central axis (CA) of the sample container carrier 140 such that a point or line of contact of each of the first holding element 150 and the second holding element 160 with the laboratory sample container 130 can be equidistant from the central axis (CA). Each of the corrugations 181 can be located at a corresponding line of contact.

In addition, the sample container carrier 140 can comprise a support in the form of the first holding element 150 and/or the second holding element 160, wherein the support can be configured to support the laboratory sample container 130. In other words, the first holding element 150 and/or the second holding element 160 can limit an insertion depth of the laboratory sample container 130.

The first holding element 150 and the second holding element 160 and their jaws 180, respectively, can define a holding region 183 for the laboratory sample container 130.

In the shown embodiment, the laboratory sample container 130 can be designed as a tube having an opening at an upper end in FIGS. 8 and 9. An end face of the laboratory sample container 130 can be supported by the first holding element 150 and/or the second holding element 160. The jaws 180 can hold or clamp the laboratory sample container 130 at its circumference. The opening of the laboratory sample container 130 can be facing away from the sample container carrier 140.

The first holding element 150 and the second holding element 160 and their jaws 180, respectively, can be configured to hold the laboratory sample container 130 such that a longitudinal axis of the laboratory sample container 130 in the form of the tube can accord with the central axis (CA).

Furthermore, a vertical length of the first holding element 150 and the second holding element 160 and their jaws 180, respectively can be chosen such that a part of the circumference of the laboratory sample container 130 is not covered by it/them. In other word, the part of the circumference can be visible from the outside. In one embodiment, a value of the length can be in the region of about 10 millimeter (mm) to about 40 mm, and in another embodiment, about 15 mm. For example, the laboratory sample container 130 may comprise a barcode at its circumference, which should be kept visible, when the laboratory sample container 130 is held by the sample container carrier 140.

Moreover, the first holding element 150 and the second holding element 160 and their jaws 180, respectively, cab each comprise an insertion support 182, as shown in FIG. 1. Each of the insertion supports 182 can be configured to cooperate together with the laboratory sample container 130 to be held such that the holding element 150, 160 comprising the insertion support 182 can be translationally displaced when the laboratory sample container 130 is inserted into the sample container carrier 140. In the shown embodiment, each insertion support 182 can be embodied as an inclined plane. In detail, each insertion support 182 can be facing towards the central axis (CA). An angle between the central axis (CA) and a respective insertion support 182 may be in the range of about 5 degrees to about 45 degrees.

Further, the sample container carrier 140 can comprise a retaining element 190 applying a force to the first holding element 150 and to the second holding element 160 such that the first holding element 150 and the second holding element 160 can be force-loaded towards each other for holding the laboratory sample container 130, as shown in FIGS. 3 and 5. In the shown embodiment, the retaining element 190 can be an elastic element in the form of a spring. Furthermore, the retaining element 190 can be mounted to the first holding element 150 and to the second holding element 160. In alternative embodiments, additionally, or alternatively, the retaining element may be mounted to the coupler and/or to the base body. Moreover, in alternative embodiments, the retaining element may not have to be mounted to the first holding element and/or to the second holding element.

Additionally, the retaining element 190 can apply a force such that the first holding element 150 and the second holding element 160 can be translationally displaced towards each other such as, for example, into a default position, when the laboratory sample container 130 is removed from the sample container carrier 140.

In detail, in the default position, the first holding element 150 and the second holding element 160 can contact each other such that a further translational displacement towards each other can be blocked. Furthermore, in the default position, a distance between the jaws 180 can be smaller than a minimal diameter of the laboratory sample container 130 to be held. However, a distance between the upper ends of the insertion supports 182 can be larger than a maximal diameter of the laboratory sample container 130 to be held.

Figure 7:
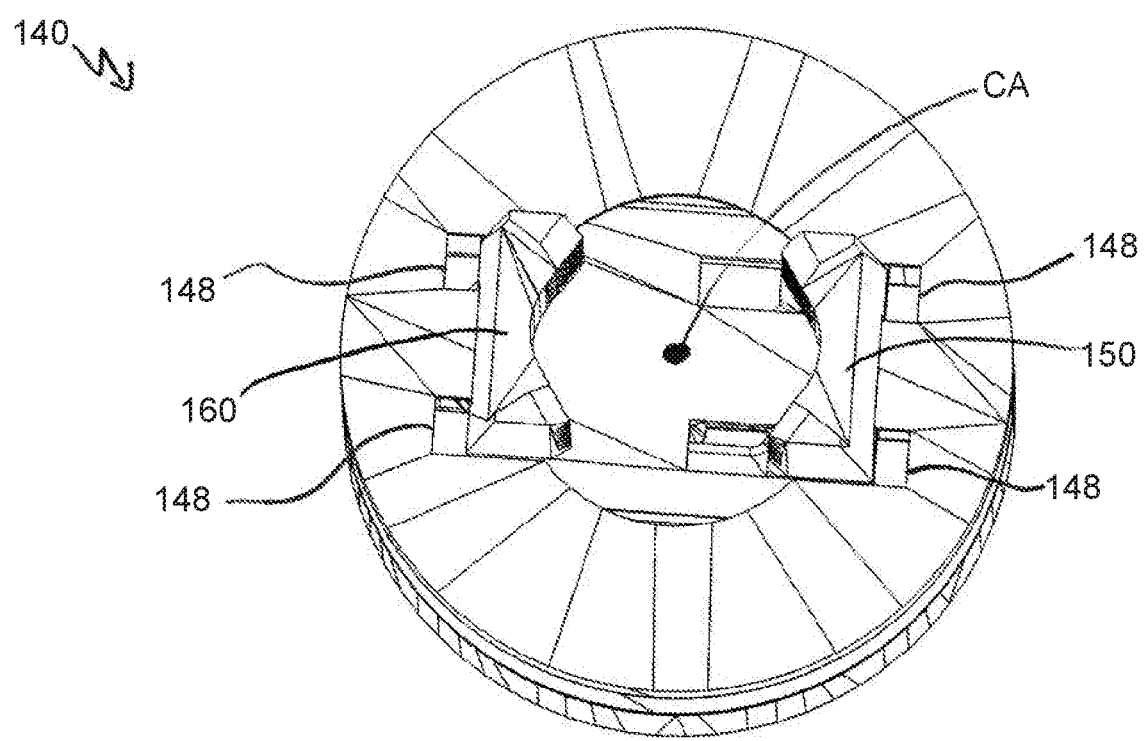
FIG. 7 illustrates a top view of the sample container carrier of FIG. 1 according to an embodiment of the present disclosure.

Furthermore, the base body 149 can comprise four stops 148, as shown in FIG. 7. The stops 148 can be configured to limit the translational displacements of the first holding element 150 and the second holding element 160 and their jaws 180, respectively, when the first holding element 150 and the second holding element 160 are translationally displaced away from each other. The first holding element 150 and the second holding element 160 can be partially arranged in the base body 149 such that the jaws 180 stick out from the base body 149.

When the laboratory sample container 130 is inserted into the sample container carrier 140, the laboratory sample container 130 can contact at least one of the insertion supports 182 and cooperate with it. Thereby, the corresponding holding element 150, 160 and via the coupler 170 the other holding element 160, 150 can be translationally displaced away from each other in opposite translational directions out of the default position, as shown in FIG. 1 by arrows P1 and P2.

When the laboratory sample container 130 is present in the holding region 183 between the first holding element 150 and the second holding element 160 and their jaws 180, respectively, the retaining element 190 can push and/or pull the first holding element 150 and the second holding element 160 against the laboratory sample container 130. The coupler 170 can ensure that the first holding element 150 and the second holding element 160 apply similar or identical holding force values to the laboratory sample container 130.

Moreover, the sample container carrier 140 can comprise a magnetically active element 145 in the form of a permanent magnet, as shown in FIGS. 2 and 3. The magnetically active element 145 can be configured to interact with a magnetic field generated by a drive element 120 such that a driving force can be applied to the sample container carrier 140. In detail, the magnetically active element 145 can be arranged within a cavity of the base body 149 such as, for example, in a lower part of the base body 149. Thereby, the magnetically active element 145 may not be translationally displaceable relative to the base body 149.

Further, the sample container carrier 140 can comprise a sliding surface 111 at its underside. In detail, the base body 149 such as, for example, its lower part, can comprise an annular-shaped sliding surface 111.

In addition, the base body 149 can be formed by a plurality of parts. In the shown embodiment, the parts can be connected by latching connections.

FIG. 8 shows a laboratory automation system 10. The laboratory automation system 10 can comprise a laboratory sample distribution system 100 and a plurality of laboratory stations 20, 25. The plurality of laboratory stations 20, 25 may comprise at least one pre-analytical, analytical and/or post-analytical station. In the shown embodiment, the laboratory stations 20, 25 can be arranged adjacent to the laboratory sample distribution system 100. Self-evidently, more than the two laboratory stations 20, 25 depicted in FIG. 8 may be comprised in the laboratory automation system 10.

The laboratory sample distribution system 100 can comprise a plurality of sample container carriers 140 as described above. Self-evidently, more than the three sample container carriers 140 depicted in FIG. 8 may be comprised in the laboratory sample distribution system 100. Furthermore, the laboratory sample distribution system 100 can comprise a transport plane 110, a plurality of drive elements 120, and a control device 125. The transport plane 110 can be configured to support the plurality of sample container carriers 140. The plurality of drive elements 120 can be configured to move the plurality of sample container carriers 140 on the transport plane 110. The control device 125 can be configured to control the plurality of drive elements 120 such that the plurality of sample container carriers 140 can move on the transport plane along corresponding transport paths such as, for example, each of the sample container carriers 140 along an individual transport path simultaneously.

The laboratory sample distribution system 100 can be configured to distribute the plurality of sample container carriers 140 and/or the laboratory sample containers 130 between the laboratory stations 20, 25.

At least one of the laboratory stations 20, 25 may comprise or be a gripper station for inserting the laboratory sample container 130 to the sample container carrier 140 or for removing the laboratory sample container 130 from the sample container carrier 140.

In detail, the plurality of drive elements 120 can comprise a plurality of electro-magnetic actuators 121. The plurality of electro-magnetic actuators 121 can be stationary arranged below the transport plane 110 and can be configured to generate a magnetic field to move the plurality of sample container carriers 140 on the transport plane 110. In the shown embodiment, the electro-magnetic actuators 121 can be implemented as solenoids having a solid ferromagnetic core. The electro-magnetic actuators 121 can be quadratically arranged in a grid having rows and columns such as, for example, in a plane parallel to the transport plane 110. In each center of a quadrat formed by corresponding electro-magnetic actuators 121 no electro-magnetic actuator may be arranged. In other words, in each second row and in each second position, there may be no electro-magnetic actuator 120.

The magnetically active element 145 of a respective sample container carrier 140 can be configured to interact with the magnetic field generated by the plurality of electro-magnetic actuators 121 such that a magnetic driving force can be applied to the sample container carrier 140.

The control device 125 can be configured to control the plurality of electro-magnetic actuators 121 such that the plurality of sample container carriers 140 can move on the transport plane along corresponding transport paths.

In detail, the electro-magnetic actuators 121 can be driven individually such as, for example, by the control device 125, in order to generate a magnetic field for each sample container carrier 140. The magnetic field can interact with the magnetically active device 145 of the sample container carriers 140. As a result of the interaction, the magnetic driving force can be applied to the sample container carrier 140. Hence, the sample container carriers 140 can be translationally moved in two dimensions x, y being substantially perpendicular to each other on or over the transport plane 110. In the shown embodiment, the sliding surface 111 of a respective sample container carrier 140 can be configured to be in contact with the transport plane 110 and can enable performing movements such as, for example, slides, of the sample container carrier 140 on the transport plane 110.

Furthermore, the laboratory sample distribution system 100 can comprise a plurality of Hall-sensors 141. The plurality of Hall-sensors 141 can be arranged such that a position of a respective sample container carrier 140 on the transport plane 110 can be detected. The control device 125 can be functionally coupled to the Hall-sensors 141 for detecting the position of the sample container carrier 140. The control device 125 can be configured to control the electro-magnetic actuators 121 in response to the detected position.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A sample container carrier for holding a laboratory sample container and for transporting the held laboratory sample container in a laboratory sample distribution system, the sample container carrier comprising:
   a first holding element;
   a second holding element, wherein the first holding element and the second holding element are translationally displaceable towards and/or away from each other for holding the laboratory sample container, wherein the first holding element and the second holding element are translationally displaced along a parallel plane perpendicular to a central axis;

a coupler comprising a lever, wherein the coupler is connected to the first holding element and to the second holding element by the lever such that the coupler couples translational displacements of the first holding element and the second holding element with each other; and a plurality of guiding elements, wherein the plurality of guiding elements is configured to guide the translational displacement/s of the first holding element and/or the second holding element and wherein the first holding element and/or the second holding element are/is translationally displaceable mounted to the guiding elements.

2. The sample container carrier according to claim 1, wherein the coupler is rotationally moveable such that the coupler couples by its rotational movement the translational displacements of the first holding element and the second holding element with each other.

3. The sample container carrier according to claim 1, wherein the first holding element and/or the second holding element comprises a plurality of jaws for holding the laboratory sample container.

4. The sample container carrier according to claim 3, wherein the jaws are distributed around a central axis (CA) in an equidistant and/or equiangular manner.

5. The sample container carrier according to claim 3, wherein at least one of the plurality of jaws comprises a corrugation for holding the laboratory sample container.

6. The sample container carrier according to claim 1, wherein the first holding element and/or the second holding element comprise/s an insertion support, wherein the insertion support is configured to cooperate together with the laboratory sample container to be held such that the holding element comprising the insertion support is translationally displaced when the laboratory sample container is inserted into the sample container carrier.

7. The sample container carrier according to claim 1, further comprises, a retaining element applying a force to the first holding element and/or to the second holding element and/or to the coupler such that the first holding element and the second holding element are force-loaded towards each other for holding the laboratory sample container.

8. The sample container carrier according to claim 1, wherein the plurality of guiding elements comprises a plurality of rails and wherein the plurality of rails is configured to guide the translational displacement/s of the first holding element and/or the second holding element.

9. The sample container carrier according to claim 1, wherein the guiding elements are arranged parallel to each other and/or wherein the coupler is arranged between the guiding elements.

10. The sample container carrier according to claim 1, further comprises a magnetically active element, wherein the magnetically active element is configured to interact with a magnetic field generated by a drive element such that a driving force is applied to the sample container carrier.

11. A laboratory sample distribution system, the laboratory sample distribution system comprising:

a plurality of sample container carriers according to claim 1;

a transport plane, wherein the transport plane is adapted to support the plurality of sample container carriers;

a plurality of drive elements, wherein the plurality of drive elements is configured to move the plurality of sample container carriers on the transport plane; and a control device, wherein the control device is configured to control the plurality of drive elements such that the plurality of sample container carriers moves on the transport plane along corresponding transport paths.

12. The laboratory sample distribution system according to claim 11, wherein the plurality of drive elements comprises a plurality of electro-magnetic actuators, wherein the plurality of electro-magnetic actuators is stationary arranged below the transport plane and is configured to generate a magnetic field to move the plurality of sample container carriers on the transport plane, wherein each of the plurality of sample container carriers comprises a magnetically active element, wherein the magnetically active element is configured to interact with the magnetic field generated by the plurality of electro-magnetic actuators such that a driving force is applied to the sample container carrier, and wherein the control device is configured to control the plurality of electro-magnetic actuators such that the plurality of sample container carriers moves on the transport plane along corresponding transport paths.

13. A laboratory automation system, the laboratory automation system comprising:

a plurality of laboratory stations; and a laboratory sample distribution system according to claim 11, wherein the laboratory sample distribution system is configured to distribute the plurality of sample container carriers and/or laboratory sample containers between the laboratory stations.

\* \* \* \* \*